O. H. REICH.
SEEDER.
APPLICATION FILED DEC. 11, 1911.

1,055,226.

Patented Mar. 4, 1913.

2 SHEETS—SHEET 1.

WITNESSES
Ruth Shreve
Nannie Meem

INVENTOR
Otto H. Reich
BY Mason Fenwick & Lawrence,
ATTORNEYS

O. H. REICH.
SEEDER.
APPLICATION FILED DEC. 11, 1911.
1,055,226.
Patented Mar. 4, 1913.
2 SHEETS—SHEET 2.
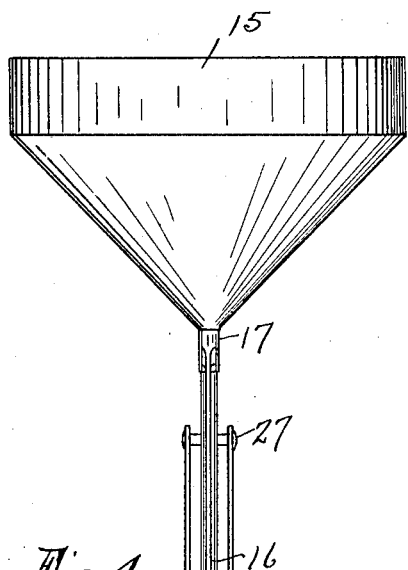
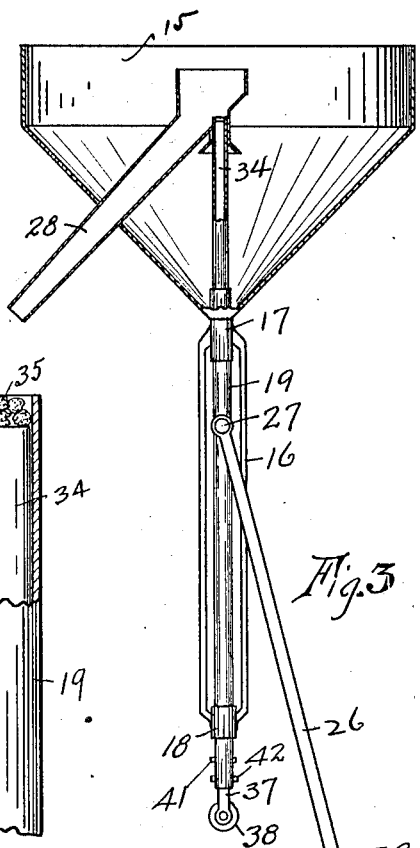
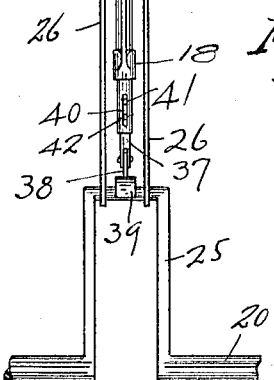
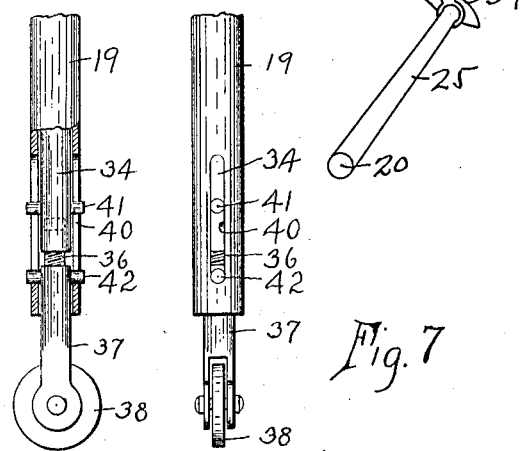
WITNESSES
Ruth Shreve
Nannie Meem
INVENTOR
Otto H. Reich,
BY Mason Fenwick & Lawrence
ATTORNEYS

UNITED STATES PATENT OFFICE.

OTTO H. REICH, OF GREENACRES, WASHINGTON.

SEEDER.

1,055,226.  Specification of Letters Patent.  Patented Mar. 4, 1913.

Application filed December 11, 1911. Serial No. 665,090.

*To all whom it may concern:*

Be it known that I, OTTO H. REICH, a citizen of the United States, residing at Greenacres, in the county of Spokane and State of Washington, have invented certain new and useful Improvements in Seeders; and I do hereby declare the following to be a full, clear, and exact description of the invention, such as will enable others skilled in the art to which it appertains to make and use the same.

This invention relates to seeders and has for an object to provide a device for depositing at predetermined intervals a predetermined quantity of seed and with improved mechanism for producing such effect.

A further object of the invention is to provide a hopper with a rod vertically slidable within such hopper embodying within its ends an adjustable cup for lifting seed from out a seed mass contained in the hopper.

A further object of the invention is to provide a seeder embodying a hopper and vertical sliding rod having a seed cup in its end and improved means for discharging the contents of the seed cup when raised to its upper limit.

With these and other objects in view the invention comprises certain novel constructions, combinations and arrangement of parts as will be hereinafter more fully described and claimed.

Figure 1:
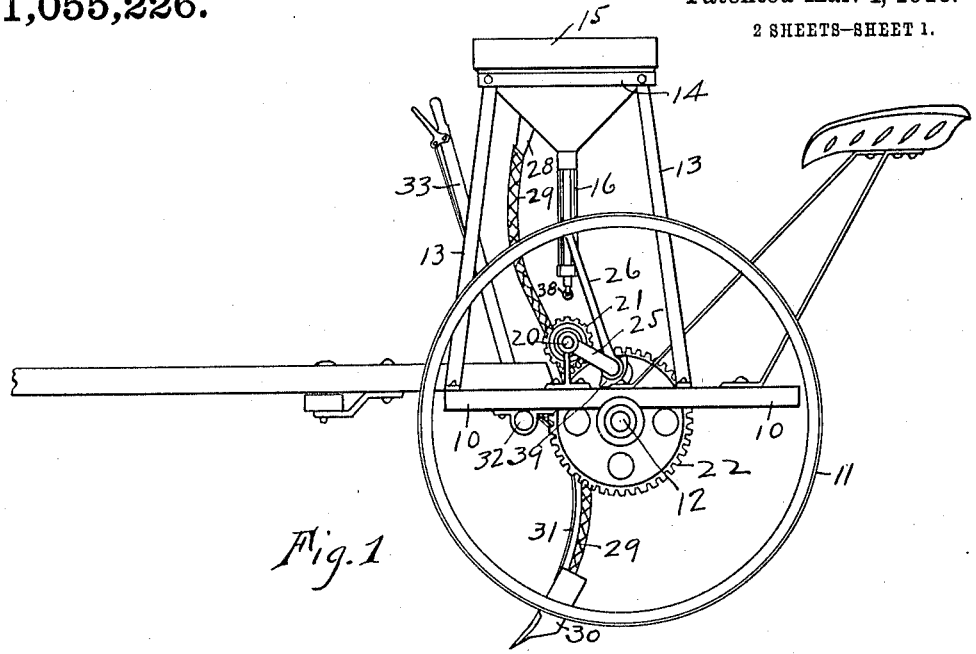
Figure 2:
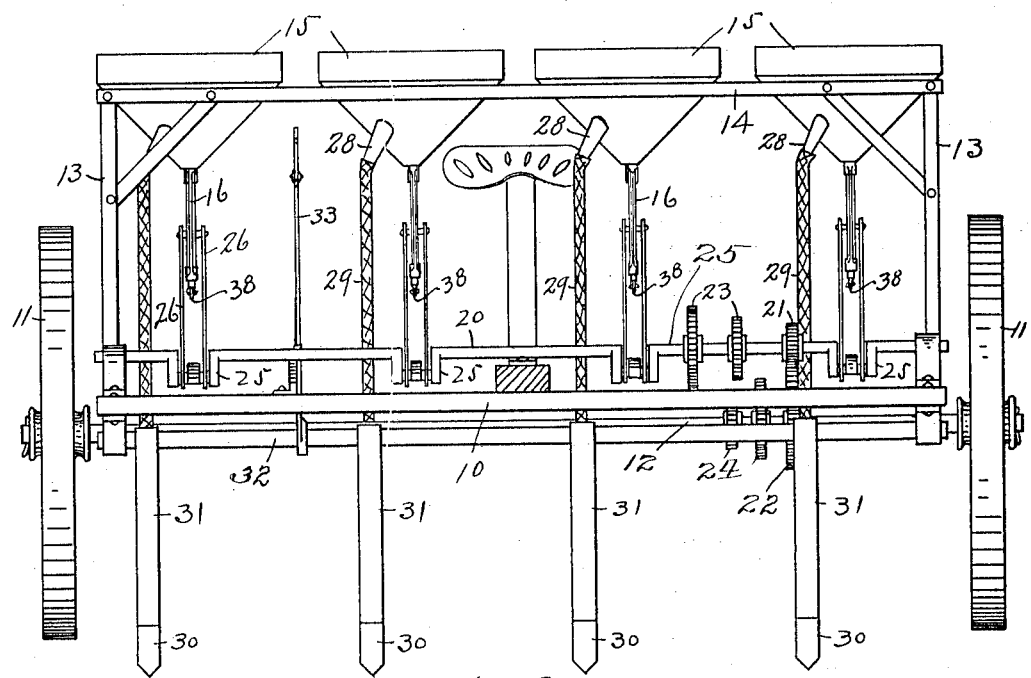

In the drawings: Figure 1 is a view of the improved seeder in end elevation. Fig. 2 is a view of the improved seeder in rear elevation. Fig. 3 is a sectional detail view showing the hopper with the seed lifting rod raised nearly to its upward limit. Fig. 4 is a view in elevation of the hopper and lifting rod with the rod lifted to its extreme limit. Fig. 5 is an enlarged detail view of the end of the lifting rod showing the seed cup. Fig. 6 is an enlarged sectional view of the lower end of the lifting rod. Fig. 7 is an enlarged detail elevation of the lower end of the lifting rod.

Like characters of reference designate corresponding parts throughout the several views.

The present invention embodies a frame 10 supported upon traction wheels 11, which said traction wheels are carried upon a shaft 12 journaled upon the frame 10. Erected upon the frame 10 are a plurality of uprights 13 supporting an upper frame 14 which carries thereon a plurality of hoppers 15. The hoppers 15 are each provided with a guide frame 16 rigidly connected thereto and extending downwardly therefrom toward but stopping short of the frame 10. The guide frame 16 is provided with an upper sleeve 17 and a lower sleeve 18 and a pipe 19 is mounted to reciprocate within such sleeves. To produce such reciprocatory motion of the pipe 19 a shaft 20 is journaled upon the frame 10 and intergeared with the shaft 12 by a pinion 21 and a spur-gear 22. To provide change of speed of rotation of the shaft 20 other gears 23 are slidably mounted upon the shaft 20 with other pinions 24 rigidly mounted upon the shaft 12 but such gears are not all used at the same time. The shaft 20 is provided with crank arms 25 to each of which are attached links 26 which are in turn pivoted as at 27 to the pipe 19 so that as the shaft 20 rotates the crank arms 25 through the medium of the links 26 causes the reciprocation of the pipe 19 within the sleeves 17 and 18.

The projection of the pipe 19 is such that at the lowest limit of its movement it is substantially at the bottom of the hopper 15 and while at its upper limit extends upward through the discharge spout 28, which said discharge spout 28 communicates through a flexible hose or coupling 29 with a shoe 30. The shoe 30 is carried upon a spring arm 31 which is rigidly connected with a shaft 32 controlled by a lever 33 to regulate the depth that the shoe 30 will be inserted in the ground. Within the pipe 19 a rod 34 is mounted, said rod traveling normally with the pipe and so proportioned as to form a cup indicated at 35 in the upper end of the pipe 19 as shown in enlarged detail at Fig. 5.

At its lower end the rod 34 connects by a screw connection 36 with the stub shaft 37 which carries a roller 38 at its lower end in position to be engaged by a shoe 39 carried by the crank arm 25. The relation of the parts is such that when the shoe 39 engages the roller 38 the stub shaft 37 and its connected rod 34 are lifted within the pipe 19 to discharge from the cup 35 the material contained therein.

To limit the movement of the parts and regulate the size of the cup the pipe 19 is provided with slots 40 and the rod 34 with a pin 41 which slides within such slots. The stub shaft 37 is also provided with a pin 42 removable therefrom and also sliding in the slots 40 so that by removing such pin 42 and rotating the stub shaft 37 the length of the pipe rod may be varied so that in normal position the upper end of the shaft 34 will be different relative to the upper end of the pipe 19 to vary the size of the cup or receptacle at the top. It will be observed that the lift of the rod will always be the same as at its lowest point of movement the pin 42 is always in engagement with the lower end of the slot 40 and the lift provided by the shoe 39 is always the same.

In operation the hoppers 15 are provided with seed as may be required and the seeder driven over the ground to be seeded. The movement of the seeder will cause the pipe 19 to reciprocate as described and at each lift seed will be taken from the bottom of the hopper in the cup 35 and carried upward into the spout 28 at which point the shoe 39 will engage the roller 38 to raise the rod and discharge the seed from the cup into such hopper from which it passes by gravity through the coupling 29 to the shoe 30 to be deposited in the earth in the opening produced by such shoe.

I claim:

1. In a seeder, a frame, a hopper mounted upon the frame, a tube adapted to be reciprocated vertically within the hopper, a rod mounted within the tube and movable relative thereto and normally stopping short of the upper end of the tube, an engaging member carried upon the lower end of the rod, a crank shaft, a crank carried by the shaft, a link connecting the crank with and to reciprocate the tube, and a shoe carried by the crank adapted to engage the engaging member and lift the rod.

2. In a seeder, a wheeled frame, a hopper mounted upon the frame, bars extending below the hopper, sleeves carried by the bars, a pipe vertically slidable within the sleeves and within the hopper, a rod slidably mounted within the tube and normally stopping short of the upper end of such tube, a crank connected with the wheels and adapted to rotate, a link connected with the crank and adapted to reciprocate the tube vertically, a contact member carried at the lower end of the rod and extending below the tube, and a shoe carried by the crank adapted to engage the contact member and lift the rod relative to the tube.

3. In a seeder, a hopper, a tube adapted to reciprocate within the hopper, a rod mounted within the tube and normally stopping short of the upper end of the tube said tube being provided adjacent its lower end with oppositely disposed slots, a pin inserted through the rod and reciprocating within the slots, a rod section connected with the rod and adapted for longitudinal variation, and a second pin carried by the rod section and moving in the said slots, whereby the rod and rod sections are held in fixed relation.

In testimony whereof I affix my signature in presence of two witnesses.

OTTO H. REICH.

Witnesses:
 H. E. SMITH,
 E. J. SCHULZE.

Copies of this patent may be obtained for five cents each, by addressing the "Commissioner of Patents, Washington, D. C."